United States Patent Office 3,115,512
Patented Dec. 24, 1963

3,115,512
PROCESS FOR THE PRODUCTION OF POLYALKYL SILICIC ACID ESTERS
Gerd Rossmy, Altendorf (Ruhr), and Jakob Wassermeyer, Dusseldorf, Germany, assignors to Th. Goldschmidt A.-G., Essen, Germany
No Drawing. Filed May 9, 1961, Ser. No. 108,755
Claims priority, application Germany Feb. 18, 1960
10 Claims. (Cl. 260—448.8)

This is a continuation-in-part application of our co-pending application Serial No. 35,137, filed on June 10, 1960, now abandoned.

The invention relates to new polyalkyl and/or polyaryl silicic acid esters and to a process for preparing such compounds. It is particularly concerned with and has as its primary object, the preparation of polyalkyl and/or polyaryl silicic acid esters of the general formula:

$$R_a(OZ)_b SiO_{2\ 1/2(a+b)}$$

in which R represents a monovalent hydrocarbon radical or mixture of such radicals selected from the class consisting of lower alkyl, aryl, alkaryl, aralkyl and alkenyl radicals, examples of which are —$CH_3$, —$C_2H_5$, isopropyl, cyclohexyl, 4-chlorobutyl, 3-acetoxylpropyl, phenyl, naphthyl, in which Z represents a mono- or polyvalent hydrocarbon radical or mixture of such radicals, such as —$CH_2$—, —$CH_3$, —$C_2H_5$, —$C_3H_6$—, cyclohexyl, 2,4-dichlorobenzyl, $$CH_3-CH=C-CH_2-C-CH_3$$
$$\phantom{CH_3-CH=C-CH_2-}|\phantom{-C-}\|$$
$$\phantom{CH_3-CH=C-CH_2-C}\phantom{-}O$$

phenyl, [R'$(OC_nH_{2n})_m$] in which R' represents any monovalent hydrocarbon radical, preferably a lower alkyl radical, $n$=any number, higher than 1, preferably 2 and 3, $m$=any number, preferably 1–100 (in derivatives of polyvalent hydroxyl compounds Z represents the portion of the molecular structure which corresponds with one hydroxyl group, so that in the case of glycol Z would be, for instance, $CH_2$) and in which $a$ represents a number of from 0.9 to 2.2, preferably 1.5 to 2.1, and $b$ a number of from 0.01 to 1, the sum of $(a+b)$ being expressed by $3>(a+b)>1$.

Polyalkyl and/or polyaryl silicic acid esters of the above general formula were formerly generally produced by one of four different methods:

The first method consists of reacting the corresponding halo-siloxanes $$R_a X_b SiO_{2\ 1/2(a+b)}$$

in which R, $a$ and $b$ have the meanings defined above, and in which X represents a halogen atom, such as chlorine, bromine, or iodine with the appropriate hydroxyl compound $(ZOH)_n$ in which $n$ represents the number of reactable hydroxy groups in the hydroxyl compound and by neutralizing the liberated acid HX with the aid of a base. The objection to this method is principally the inaccessibility of the siloxane starting material and, in the case of longer-chain siloxanes, the badly defined and difficulty reproducible polymer distribution.

The second method is effected by the partial hydrolysis of monomeric alkoxy compounds $R_a Si(OZ)_{4-a}$, in which R, $a$ and Z have the meaning defined above.

This method involves a high expenditure of hydroxyl compounds and also produces polysiloxanes having a difficulty reproducible polymer distribution which is not in equilibrium.

In the third method the re-esterification of the compound obtained by the second method set out above with another hydroxyl compound with the aid of alkaline or acid catalysts is brought about. The resulting compounds have the same characteristics and disadvantages as those obtained by the second method.

The fourth method consists of an alkaline catalyzed equilibration of monomer alkoxysilanes with cyclic dialkylsiloxanes. With this method the necessity for producing cyclic siloxanes has proved to be inconvenient. Besides this the method is limited to polyalkylsilicic acid esters, which are indifferent against alkali and which are furthermore not or only little branched.

Objects of the present invention are to provide improved simple and inexpensive methods for the production of polyalkyl and/or polyaryl silicic acid esters, to provide improved methods for the production of polyalkyl- and/or polyaryl silicic acid esters of definite structure and which have a polymer distribution which is in approximately statistic equilibrium and methods for the production of polyalkyl and/or polyaryl silicic acid esters of limited molecular size.

Other objects and advantages of the present invention will be evident from the following description.

In accordance with the invention, poly-alkyl and/or polyaryl silicic acid esters which have the general formula set out above, and which have a polymer distribution which is in approximately statistical equilibrium can readily and economically be obtained by reacting with organic hydroxyl compounds organo-poly-siloxanes containing halogen and silyl sulphate groups.

The organo-poly-siloxane starting materials can be— for example—readily obtained by methods described and claimed in our copending patent applications Ser. Nos. 35,139 and 35,138 and filed June 10, 1960, both now abandoned, and which starting materials have a molecule limited in size by hydrolyzable groups.

As shown in the examples these methods of production can also be applied to the extremely branched siloxane systems, particularly when the water/sulfuric acid mixture is dissolved in a solvent during the production.

Such organo-poly siloxanes can be defined by the general formula:

$$R_x SiO_y (SO_4)_z X_{4-(x+2y+2z)}$$

in which R represents a monovalent hydrocarbon radical or mixture of radicals, preferably a lower alkyl radical, X represents a halogen atom, preferably chlorine and in which $x$ has a value equal to 0.9 to 2.2, preferably 1.5 to 2.1, $y$ a value equal to 0.75 to 1.5, preferably 0.9 to 1.3, and $z$ a value of from 0.0001 to 0.5, preferably 0.001 to 0.1, $(x+2y+2z)$ being expressed by $4>(x+2y+2z)>2$.

These organo siloxanes are distinguished in that the hydrocarbon radicals which may be the same or different, are statistically uniformly distributed on the siloxane chain, and that the polymer distribution itself is likewise in statistical equilibrium or at least considerably approximates to such equilibrium.

If these compounds are reacted with organic hydroxyl compounds the silicon halide and silicon sulphate groups are split off with the formation of Si—OZ bonds. Preferably the liberated acid is neutralized with a base in order to improve the yield. Suitable bases include, for instance, metal hydroxides or their alkoxy derivates, such as sodium methylate, ammonia, amines and pyridines.

The resultant polyalkyl or polyaryl silicic acid esters are thus not only more economically obtainable than hitherto, but their properties are also more uniform and better balanced because of the approximate equilibrium of polymer distribution, so that they may with justification be called a novel class of compounds.

The characteristic properties impressed upon the substances by the alkyl siloxane and alkoxy groups can therefore be much more satisfactorily controlled. This is of especial importance if these properties are invested with opposite characteristics, as is the case for instance in polysiloxanes which have been water-solubilized by means of polyethylene glycol monoalkyl ether terminal groups (or corresponding derivates of propylene glycol).

With the aid of the compounds obtained by the method herein proposed a siloxane chain of greater average length can be brought into aqueous solution with the same expenditure of polyether groups than was possible by the method hitherto known to the art.

According to the invention it is possible to produce, besides the siloxane-poly alkyleneoxyd-block-copolymers already known, such modified siloxanes of quite new structures.

An example for those new substances are the compounds of the general Formula A:

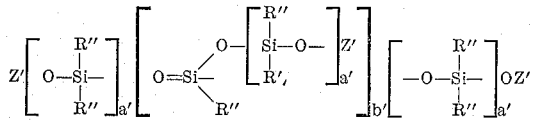

These compounds are defined best for the expert by the above formula, though they can, of course, be defined by the formula

$$R_a(OZ)_b SiO_{2\ 1/2(a+b)}$$

The experts know, of course, that the chosen formula shows only the gross composition and not the fine details of the structure of the polymeric compound. Thereby $Z'$ means a lower alkyl radical or $[R'(OC_nH_{2n})_m]$, $R'$ represents a monovalent hydrocarbon radical, any radical may be used, preferably a lower alkyl radical or phenyl or alkylphenyl, $n$ being 2 to 3, $m$ representing any number, preferably 1–100, $R''$ represents a lower alkyl radical—preferably methyl—and phenyl, vinyl, allyl; the radicals may be of the same kind or different, $a'$ represents a number from 0.5 to 100, preferably 1 to 20, $b'$ being a number from 2 to 50, preferably from 2 to 20.

The production of these compounds according to the invention is effected by converting poly-glycol-monoalkyl-(aryl) ethers with the suitable starting materials according to the invention

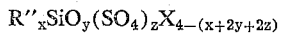
$$R''_x SiO_y(SO_4)_z X_{4-(x+2y+2z)}$$

Such starting materials according to the invention are obtained (the mole dates $a'$ and $b'$ refer to the a.m. Formula A) by converting and equilibrating $(2a'+a'b')$ moles $R''_2SiX_2$ and $b'$ moles $R''SiX_3$ with

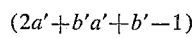
$$(2a'+b'a'+b'-1)$$

moles of water and a certain amount of sulfuric acid.

It is preferred to effect this conversion in one stage (hydrolysis with subsequent equilibration), but it is also possible to effect the same in several stages, solvents can also be used. The quantity of the sulfuric acid required depends on the composition of the halosilane mixture and the equilibration temperature (30–150° C.); it is limited in its maximum by the condition, that, together with water, it may not be sufficient for splitting off all halogen atoms from silicon, therefore it must be less than $(0.5b'+1)$ moles. The so produced starting materials according to the invention are reacted as known with the compound Z'OH, preferably by neutralizing the liberated acids HX and $H_2SO_4$ with ammonia or amines.

The so-produced compositions of Formula A are suitable as intermediate product for the production of resin-like silicone coatings, when $Z'$ represents $[R'(OC_nH_{2n})_m]$ also as foam stabilizing additions for the polyurethan-foam production according to the "one shot" procedure.

The properties of the compounds produced by the method according to the invention naturally largely depend upon the organo-silicon and hydroxy compounds used. Reference has already been made to the special importance of the compounds which are derived by treatment with the polyglycol monoalkyl ethers.

The use contemplated for derivatives of low molecular aliphatic alcohols is entirely different. In the majority of cases the alkoxy group is intended to limit the molecular weight of the neutral siloxane for the purpose of a transfer or exchange process in order to permit them to be split off easily in substantially or wholly neutral conditions with the simultaneous considerable enlargement of the molecular structure of the siloxane.

The products of this invention may be employed for any of those uses for which polyalkyl and/or polyaryl silicic acid esters are normally employed. Some of them may also be employed as brake fluids, synthetic resins, paints and varnish for vehicles, heat transfer media, hydrophobic agents for fabrics, cements and ceramics, hydraulic fluids and intermediates in the production of synthetic elastomers.

The following examples are illustrative only and are not to be construed as limiting the invention which is properly delineated in the appended claims.

*Example 1*

593.4 parts by weight of dimethyl dichlorosilane were reacted in a round-bottom flask within two hours with a mixture of 19.7 parts by weight of sulphuric acid and 64.8 parts by weight of water. The escaping hydrochloric acid was freed in a cooling trap at a temperature of −60° C. from the silane carried down, which was then added again to the reaction mixture, consisting of two layers. The mixture was then heated to 60° C. and vigorously stirred at this temperature for 12 hours, whereafter the product was homogeneous and set into statistical equilibrium. A 100% yield was obtained. The Cl⁻ and SO₄⁻⁻ content was titrametically determined: 16.72% Cl⁻ and 4.315% SO₄⁻⁻. This corresponds to a product of the formula:

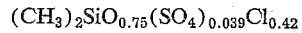
$$(CH_3)_2 SiO_{0.75}(SO_4)_{0.039} Cl_{0.42}$$

83.2 parts by weight of pure methanol were added to 419 parts by weight of the equilibrated product. The reaction mixture was then saturated with gaseous ammonia. The precipitated ammonium salts were then filtered off and the filtrate was applied for distillation at a 25 cm.-column. 249 g. of the formed α,Ω-dimethoxy-dimethylsiloxanes were distillable which corresponds to 72.7%; the residue of 27.3% could not be distilled. The distillable portion was detected in fractions and the different fractions were identified according to their boiling points and their methoxyl-contents. The following polymer distribution was obtained:

| N | B.P., °C. | Torr | Methoxyl obtained, percent | Methoxyl theoretical, percent | Yield | |
|---|---|---|---|---|---|---|
| | | | | | Gram | percent |
| 0 | 82 | 760 | 51.9 | 51.6 | 9.65 | 3.87 |
| 1 | 139 | 760 | 31.6 | 31.9 | 14.72 | 5.92 |
| 2 | 83 | 24 | 23.8 | 23.12 | 21.82 | 8.77 |
| 3 | 90 | 5 | 17.7 | 18.11 | 31.68 | 12.72 |
| 4 | 89 | 0.5 | 15.1 | 14.9 | 40.67 | 16.32 |
| 5 | 104 | 0.5 | 12.4 | 12.65 | 39.51 | 15.89 |
| 6 | 117 | 0.5 | 11.1 | 10.99 | 24.37 | 9.76 |
| 7 | 124 | 0.2 | 9.4 | 9.72 | 20.79 | 8.34 |
| 8 | 131 | 0.2 | 8.9 | 8.7 | 17.67 | 7.09 |
| 9 | 136 | 0.1 | 7.6 | 7.88 | 14.45 | 5.8 |
| 10 | 141 | 0.1 | 7.1 | 7.21 | 13.57 | 5.45 |

N represents the number of silicium atoms being linked together over Si—O—Si.

The polymer distribution shows a maximum for N=4, as it should be with a product according to Formula A (column 3) having the values of

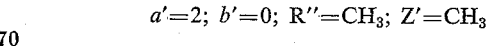
$$a'=2;\ b'=0;\ R''=CH_3;\ Z'=CH_3$$

*Example 2*

25.2 parts by weight of isopropylamine, dissolved in 100 parts by weight of dioxane, and 567 parts by weight of a polyethylene glycol monomethyl ether having a mean molecular weight of 1,220 were added to 188 parts by weight of a siloxane of the general formula $$(CH_3)_2SiO_{0.917}(SO_4)_{0.039}Cl_{0.088}$$

After separation of 29 parts by weight of a salt-like residue and removal of the solvent, 712 parts by weight of a waxy readily water-soluble substance was obtained. The ready solubility in water indicated that the polymer distribution in the reaction product was at least approximately in accordance with statistical equilibrium.

The experiment was repeated with the difference that the isopropylamine was replaced by equivalent quantities of triethylamine and diethylamine, and the results of the reactions in both cases were analogous.

*Example 3*

800 parts by weight of benzene and 447 parts by weight of a polyalkylene oxide monomethyl ether having a mean molecular weight of 1,685 obtained by linking equimolar quantities of ethylene oxide and propylene oxide with methanol, were added to 138 parts by weight of a siloxane of the general formula:

$$(CH_3)_2SiO_{0.935}(SO_4)_{0.006}Cl_{0.118}$$

An excess of ammonia was introduced into this mixture and, after filtration and the removal of the benzene at the end of one hour, 513 parts by weight of a viscous liquid were obtained which gave a clear solution in water.

*Example 4*

4000 parts by weight of an absolute benzene (absolutely waterfree benzene) and 2988 parts by weight of a polyalkylene oxide monobutyl ether having a molecular weight of 1703 obtained by adding equimolar quantities of ethylene oxide and propylene oxide to butanol, were added to 926.5 parts by weight of a siloxane of the general formula $$(CH_3)_{1.91}SiO_{0.97}(SO_4)_{0.0074}Cl_{0.135}$$

An excess of ammonia was introduced into this reaction mixture at a temperature of 22–38° C. After filtration the benzene was removed by distillation. 3160 parts by weight of a product were obtained, which correspond to a yield of 82.1%, having a viscosity of 1866 cp and corresponding to Formula A (column 3) with values of $$a'=6.17;\ b'=3;\ R''=CH_3;\ Z'=(O_2C_5H_{10})_{15.83}C_4H_9$$

This corresponds to: Si=8.69%; C=52.85%; H=9.53%. Obtained were: Si=8.45%; C=52.4%; H=9.7%. The product gave a clear solution in water.

*Example 5*

4100 parts by weight of dried benzene and 3092.8 parts by weight of a polyalkylene oxide monobutyl ether having a molecular weight of 1703 obtained by adding equimolar quantities of ethylene oxide and propylene oxide to butanol, were added to 959.6 parts by weight of siloxane of the general formula:

$$(CH_3)_{1.91}SiO_{0.97}(SO_4)_{0.0074}Cl_{0.135}$$

This mixture was heated to 70° C. An excess of ammonia was then introduced, and after filtration the benzene was removed by distillation. 3640 parts by weight of a product were obtained, which correspond to a yield of 94.5%, having a viscosity of 2315 cp and corresponding to a theoretical composition according to Formula A (column 3) having the values of $$a'=6.17;\ b=3;\ R''=CH_3;\ Z'=(O_2C_5H_{10})_{15.83}C_4H_9$$

This corresponds to: Si=8.69; C=52.85%; H=9.53%. Obtained were: Si=8.45%; C=52.4%; H=9.7%. The product was clearly soluble in water.

*Example 6*

3400 parts by weight of a dried benzene and 3388 parts by weight of a polyalkylene oxide monomethyl ether having a molecular weight of 1640 obtained by adding equimolar quantities of ethylene oxide and propylene oxide to methanol, were mixed with 962 parts by weight of a siloxane of the general formula $$(CH_3)_{1.89}SiO_{0.97}(SO_4)_{0.0073}Cl_{0.16}$$

An excess of ammonia was introduced into the reaction mixture at a temperature of 22–36° C. After filtration the benzene was removed by distillation. 4183 parts by weight of a substance, which correspond to a yield of 97.9%, were obtained having a viscosity of 1939 cp. This substance had a theoretical composition corresponding to Formula A (column 3) with values of:

$$a'=5.6;\ b'=4;\ R''=CH_3;\ Z'=(O_2C_5H_{10})_{15.8}CH_3$$

This corresponds to: C=53.3%; H=9.55%; Si=8.1%. Obtained were: C=51.8%; H=8.9%; Si=7.88%. The product gave a clear solution in water.

*Example 7*

3540 parts by weight of a dry benzene and 3420 parts by weight of a polyalkylene oxide monomethyl ether having a molecular weight of 1640 obtained by adding equimolar quantities of ethylene oxide and propylene oxide to methanol, were mixed with 972 parts by weight of a siloxane of the general formula $$(CH_3)_{1.89}SiO_{0.97}(SO_4)_{0.0073}Cl_{0.16}$$

An excess of ammonia was introduced into the reaction mixture at a temperature of 69–75° C. After filtration the benzene was removed by distillation. 4188 parts by weight of a substance, which correspond to a yield of 98%, were obtained having a viscosity of 2170 cp. This substance showed a theoretical composition corresponding to Formula A (column 3) with values of:

$$a'=5.6;\ b'=4;\ R''=CH_3;\ Z'=CH_3(O_2C_5H_{10})_{15.8}$$

This corresponds to: C=53.3%; H=9.55%; Si=8.1%. Obtained were: C=52.1%; H=9.55%; Si=7.69%. The product gave a clear solution in water.

*Example 8*

3510 parts by weight of an absolute benzene and 3215 parts by weight of a polyalkylene oxide monomethyl ether having a molecular weight of 1620 obtained by adding equimolar quantities of ethylene oxide and propylene oxide to butanol, were mixed with 925.1 parts by weight of a siloxane of the general formula:

$$(CH_3)_{1.885}SiO_{0.9775}(SO_4)_{0.0074}Cl_{0.1595}$$

An excess of ammonia was introduced into the mixture at a temperature of 18–35° C. After subsequent filtration the benzene was removed by distillation. 4056.8 parts by weight of a product were obtained having a viscosity of 1327 cp. This product had a theoretical composition corresponding to Formula A (column 3) with values of $$a'=5.56;\ b'=5;\ R''CH_3;\ Z'=C_4H_9(O_2C_5H_{10})_{15}$$

This corresponds to: C=53.3%; H=9.55%; Si=8.11%. Obtained were: C=52.07%; H=9.46%; Si=7.71%. The product was clearly soluble in water.

*Example 9*

3480 parts by weight of a dry benzene and 3300 parts by weight of a polyalkylene oxide monobutyl ether according to Example 8 were mixed with 948 parts by weight of a siloxane as described in Example 8. An excess of ammonia was introduced into the reaction mixture at a temperature of 70–76° C. After subsequent filtration the benzene was removed by distillation. 4204.4 parts by weight of a substance were obtained having a viscosity of 1442 cp. The theoretical composition of this substance was corresponding to Example 8. The analysis showed that C=52.23; H=9.52; Si=7.73.

Example 10

3445 parts by weight of dried benzene and 3475 parts by weight of a polyalkylene oxide monobutyl ether according to Example 8 were mixed with 930.9 parts by weight of siloxane of the general formula $$(CH_3)_{1.873}SiO_{0.984}(SO_4)_{0.00733}Cl_{0.1595}$$

An excess of ammonia was introduced into this mixture at a temperature of 19–34° C. After subsequent filtration the benzene was removed by distillation. 4191 parts by weight of a product were obtained, which correspond to a yield of 98%, having a viscosity of 1097 cp. The theoretical composition of this product corresponded to Formula A (column 3) with values of $$a'=5.47;\ b'=8;\ R''=CH_3;\ Z'=C_4H_9(C_5H_{10}O_2)_{15}$$

This corresponds to: C=53.45%; H=9.56%; Si=7.86%. Obtained were: C=52.84%; H=9.49%; Si=7.22%. The product was clearly soluble in water.

Example 11

3105 parts by weight of a dried benzene and 3360 parts by weight of a polyalkylene oxide monobutyl ether according to Example 8 were mixed with 928 parts by weight of a siloxane of the general formula $$(CH_3)_{1.745}SiO_{0.9875}(SO_4)_{0.00738}Cl_{0.1598}$$

An excess of ammonia was introduced into the reaction mixture at a temperature of 21–37° C. After subsequent filtration the benzene was removed by distillation. 4240 parts by weight of a product were obtained, which represent a yield of 99.5%, having a viscosity of 852.5 cp. The theoretical composition was corresponding to Formula A (column 3) with values of $$a'=5.41;\ b'=11;\ R''=CH_3;\ Z'=C_4H_9(O_2C_5H_{10})_{15}$$

This corresponds to: C=53.45%; H=9.555%; Si=7.88%. Obtained were: C=53.57%; H=9.58%; Si=7.53%. The product gave a clear solution in water.

Example 12

5400 parts by weight of an undried benzene and 3000 parts by weight of a polyalkylene oxide monobutyl ether according to Example 8 were mixed, and the water was removed by distillation of 2000 parts by weight of benzene. 996 parts by weight of a siloxane of the general formula $$(CH_3)_{1.91}SiI_{0.97}(SO_4)_{0.00738}Cl_{0.13524}$$

were added to the mixture and an excess of ammonia was introduced. After subsequent filtration the benzene was removed by distillation. 3806.9 parts by weight of a product were obtained, which correspond to a yield of 97.6%, having a viscosity of 3218 cp. The theoretical composition was corresponding to Formula A (column 3) with values of $$a'=6.17;\ b'=3;\ R''=CH_3;\ Z'=C_4H_9(C_5H_{10}O_2)_{15.83}$$

This corresponds to: Si=8.69%; C=52.85%; H=9.53%. Obtained were: Si=8.47%; C=52.93%; H=9.58%. The product gave a clear solution in water.

Example 13

100 parts by weight of a dried benzene and 70.5 parts by weight of a polyethylene oxide monophenyl ether having a molecular weight of 265.8 were mixed with 118.2 parts by weight of a siloxane of the general formula $$(CH_3)_{1.895}SiO_{0.973}(SO_4)_{0.00732}Cl_{0.1595}$$

An excess of ammonia was introduced into the reaction mixture at a temperature of 75–83° C. After subsequent filtration the benzene was removed by distillation. 166.4 parts by weight of a product were obtained, which correspond to a yield of 92.4%, having a viscosity of 154.6 cp. The theoretical composition of this product was corresponding to Formula A (column 3) with values of $$a'=5.6;\ b'=4;\ R''=CH_3;\ Z'=C_6H_5(OC_2H_4)_4$$

This corresponds to: C=43.54%; H=7.9%; Si=23.64%. Obtained were: C=42.87%; H=7.92%; Si=22.33%.

Example 14

79 parts by weight of polyethylene oxide monomethyl ether having a molecular weight of 418.5 and 90 parts by weight of a dried benzene were mixed with 81.4 parts by weight of a siloxane of the general formula $$(CH_3)_{1.12}SiO_{0.0956}(SO_4)_{0.01451}Cl_{0.1451}$$

An excess of ammonia was introduced into the reaction mixture at a temperature of 70–78° C. After subsequent filtration the benzene was removed by distillation. 137 parts by weight of a product were obtained corresponding to a yield of 89%. This product has a viscosity of 154.1 cp. and a theoretical composition which corresponds to Formula A (column 3) with values of $$a'=6.63;\ b'=3;\ R''=CH_3;\ Z'=CH_3(CH_2.CH_2O)_{8.7}$$

This corresponds to: C=40.6%; H=8.3%; Si=21.3%. Obtained were: C=41.3%; H=8.6%; Si=20.7%.

Example 15

295 parts by weight of a dried benzene and 308 parts by weight of a polyalkylene oxide monobutyl ether according to Example 8 were mixed with 50 parts by weight of a polysiloxane of the general formula $$(CH_2=CH)_{0.1725}(CH_3)_{1.677}SiO_{0.992}(SO_4)_{0.00863}Cl_{0.259}$$

An excess of ammonia was introduced into the reaction mixture at a temperature of 21–35° C. After subsequent filtration the benzene was removed by distillation. 338 parts by weight of a product were obtained, which correspond to a yield of 94%, having a viscosity of 1312 cp. The theoretical composition of this product corresponds to Formula A (column 3) with values of $a'=3.26$; $b'=4$; $R''=90.74\%\ CH_3$; $9.26\%\ CH_2=CH$; all the $CH_2=CH$-groups being attached to a silicon atom which is connected with these oxygen atoms;

$$Z'=C_4H_9(O_2C_5H_{10})_{15}$$

This corresponds to: C=55.1%; H=10.35%; Si=5.84%. Obtained were: C=55.98%; H=11.01%; Si=5.62%.

Example 16

150 parts by weight of an absolute benzene and 162 parts by weight of a polyalkylene oxide monobutyl ether according to Example 8 were mixed with 162 parts by weight of a polysiloxane of the general formula $$(C_6H_5)_{0.084}(CH_3)_{1.835}SiO_{0.952}(SO_4)_{0.00668}Cl_{0.167}$$

An excess of ammonia was introduced into the reaction mixture at a temperature of 19–27° C. After subsequent filtration the benzene was removed by distillation. 198 parts by weight of a product were obtained, which correspond to a yield of 95.6%, having a viscosity of 1163 cp. The theoretical composition of this product corresponds to Formula A (column 3) with values of $a'=5.28$; $b'=2$; $R''=95.64\%\ CH_3$; $4.36\%\ C_6H_5$; all the phenyl-groups being attached to a silicon atom which is connected with three oxygen atoms; $Z'=C_4H_9(O_2C_5H_{10})_{15}$.

This corresponds to: C=53.6%; H=10.05%; Si=8.15%. Obtained were: C=53.93% H=10.76%; Si=7.91%.

Example 17

1781 parts by weight of dimethyldichlorosilane and 598 parts by weight of methyltrichlorosilane were reacted within three hours while stirring in a round-bottom flask, which is provided with a dropping funnel, a stirrer and a reflux condenser and being connected with a cooling trap, with a mixture of 284 parts by weight of water and 90 parts by weight of sulphuric acid. After these three hours some silane being collected in the cooling trap at −90° C. was added again to the reaction mixture, whereafter the content of the flask was slowly heated to 60° C. After ½ hour the content of the flask suddenly set, but after 12 hours' standing at room temperature it got liquid and homogeneous again. In order to complete the equilibration the product was stirred for 2 hours at 120° C.

In practical 100% yield a siloxane of the general formula was obtained $$(CH_3)_{1.66}SiO_{0.838}(SO_4)_{0.0763}Cl_{0.507}$$

This corresponds to a theoretical composition of C=21.75%; H=5.12%; Si=30.8%; Cl=19.65%; S=2.78%. Obtained were: C=21.82%; H=5.07%; Si=30.71%; Cl=19.72%; S=2.63%.

106 parts by weight of this siloxane were reacted with 25.5 parts by weight of ethanol and 32.7 parts by weight of isopropylamine and the reaction mixture was stirred for ½ hour. The resulting salt was filtered off and the excess of ethanol was removed by distillation. 76 parts by weight of a water-clear product was formed, which correspond to a yield of 91%, having a viscosity of 13 cp.

|  | Percent |
|---|---|
| Content of oxy-groups | 36.1 |
| Theoretically | 36.4 |

*Example 18*

14.78 parts by weight of a pure ethanol were mixed with 107.8 parts by weight of a siloxane of the general formula $$(CH_3)_{1.95}SiO_{0.942}(SO_4)_{0.0324}Cl_{0.1298}$$

An excess of ammonia was introduced into the reaction mixture at a temperature of 23–46° C. After subsequent filtration the excess of ethanol was evaporated in a vacuum. 74.8 parts by weight of a product, which correspond to a yield of 96.5 percent, were obtained having a viscosity of 21 cp. The composition of the same corresponded to Formula A (column 3) with values of $$a'=6.47;\ b'=3;\ R''=CH_4;\ Z'=C_2H_5$$

This corresponds to C=36.29%; H=7.87%; Si=34.18%. Obtained were C=35.95%; H=7.82%; Si=34.32%.

*Example 19*

130 parts by weight of octanol were solved in 100 parts by weight of an absolute benzene and were then mixed with 488.45 parts by weight of a siloxane of the general formula $$(CH_3)_{1.885}SiO_{0.9775}(SO_4)_{0.0074}Cl_{0.1595}$$

An excess of ammonia was introduced at a temperature of 19–32° C. After subsequent filtration 531.5 parts by weight of a product were obtained, which correspond to a yield of 95.4%, having a viscosity of 37.3 cp. The theoretical composition of this product was corresponding to Formula A (column 3) with values of $$a'=5.56;\ b'=5;\ R''=CH_3;\ Z'=C_8H_{17}$$

This corresponds to: C=42.6%; H=9.9%; Si=31.58%. Obtained were: C=41.9%; H=9.75%; Si=31.86%.

*Example 20*

148 parts by weight of a dried butanol were mixed with 977 parts by weight of a siloxane of the general formula $$(CH_3)_{1.873}SiO_{0.984}(SO_4)_{0.00733}Cl_{0.1595}$$

An excess of ammonia was introduced into this mixture at a temperature of 23–38° C. After subsequent filtration traces of butanol being not converted were distilled in a vacuum. 990 parts by weight of a product were obtained, which correspond to a yield of 96.6%, having a viscosity of 43.2 cp. The composition of this product was corresponding to Formula A (column 3) with values of $$a'=5.47;\ b'=8;\ R''=CH_3;\ Z'=C_4H_9$$

This corresponds to: C=36.6%; H=8.57%; Si=36.85%. Obtained were: C=36.12%; H=8.49%; Si=37.02%.

Various changes and modifications may be made without departing from the spirit and scope of the present invention, and it is intended that such obvious changes and modifications be embractd by the annexed claims.

Having thus described the invention, what is claimed as new and desired to be secured by Letters Patent is:

1. The method of producing silicic acid esters in which the polymer distribution is in approximately statistical equilibrium of the general formula:

$$R_a(OZ)_bSiO_{2\ 1/2(a+b)}$$

wherein R represents at least one monovalent hydrocarbon radical selected from the group consisting of alkyl, aryl, aralkyl, alkaryl and alkenyl radicals, Z represents at least one member selected from the group consisting of monovalent and polyvalent hydrocarbon radicals, $a$ is a number having a value of 0.9 to 2.2 and $b$ a number having the value of 0.01 to 1, $(a+b)$ being expressed by $3>(a+b)>1$, which comprises reacting an equilibrated mixture of organosiloxanes of the general formula:

$$R_xSiO_y(SO_4)_zX_{4-(x+2y+2z)}$$

wherein R has the meaning defined above, X represents a member selected from the group consisting of chlorine, bromine, iodine, $x$ is a number having a value of 0.9 to 2.2, $y$ is a number equal to 0.75 to 1.5 and $z$ is a number equal to 0.0001 to 0.5, $(x+2y+2z)$ being expressed by $4>(x+2y+2z)>2$, with a hydroxyl compound of the formula $(ZOH)_n$ in which $n$ is equal to the number of reactable hydroxyl groups in said hydroxyl compound, neutralizing the liberated acid formed in said reaction, and recovering said silicic acid ester.

2. The method of producing silicic acid esters in which the polymer distribution is in approximately satistical equilibrium of the general formula:

$$R_a(OZ)_bSiO_{2\ 1/2(a+b)}$$

wherein R represents methyl, Z represents at least one member selected from the group consisting of monovalent hydrocarbon radicals, $a$ is a number having a value of 0.9 to 2.2 and $b$ a number having the value of 0.01 to 1, $(a+b)$ being expressed by $3>(a+b)>1$, which comprises reacting an equilibrated mixture of organosiloxanes of the general formula:

$$R_xSiO_y(SO_4)_zX_{4-(x+2y+2z)}$$

wherein R has the meaning defined above, X represents chlorine, $x$ is a number having a value of 0.9 to 2.2, $y$ is a number equal to 0.75 to 1.5 and $z$ is a number equal to 0.0001 to 0.5, $(x+2y+2z)$ being expressed by $$4>(x+2y+2z)>2$$

with a hydroxyl compound of the formula $(ZOH)_n$ in which $n$ is equal to the number of reactable hydroxyl groups in said hydroxyl compound, neutralizing the liberated acid formed in said reaction, and recovering said silicic acid ester.

3. Method according to claim 1, in which said hydroxyl compound is a monohydric lower molecular aliphatic alcohol selected from the group consisting of methanol, ethanol, propanol, isopropanol, butanol, and isobutanol.

4. Method according to claim 1, in which said hydroxyl compound is an addition compound of a monovalent hydroxyl compound with a member selected from the group consisting of ethylene oxide and propylene oxide and mixtures thereof.

5. Method according to claim 1, in which said hydroxyl compound is an addition compound of a lower molecular aliphatic alcohol with a member selected from the group consisting of ethylene oxide and propylene oxide.

6. Method according to claim 1, which comprises neutralizing said liberated acid with a base which is a member selected from the group consisting of ammonia, amines and pyridines.

7. An equilibrated mixture of compounds of the general formula:

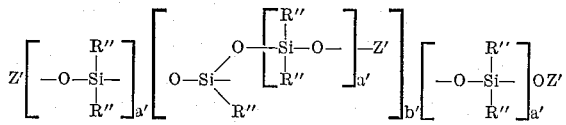

wherein R'' represents a member selected from the group consisting of lower alkyl radicals, phenyl, vinyl and mixtures thereof, Z' represents a radical derived from a compound and mixture of compounds Z'OH, which are addition compounds of a monovalent hydroxyl compound with a member selected from the group consisting of ethylene oxide, propylene oxide and mixtures thereof, $a'$ is a number having values of 0.5 to 100, $b'$ is a number having values of 2 to 50.

8. An equilibrated mixture of compounds of the general formula:

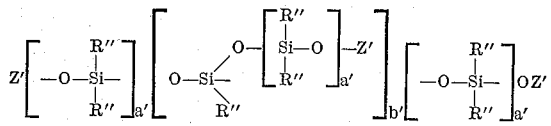

wherein R'' represents $CH_3$, Z' represents a radical derivated from a compound and mixtures of compounds Z'OH which are addition compounds of a monohydric lower molecular aliphatic alcohol with a member selected from the group consisting of ethylene oxide, propylene oxide and mixtures thereof, $a'$ is a number having values of 1 to 15 and $b'$ is a number having values of 2 to 10.

9. An equilibrated mixture of compounds of the general formula:

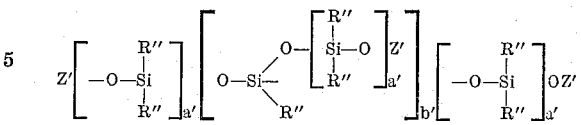

wherein R'' represents $CH_3$, Z' represents a radical derived from a compound and mixtures of compounds Z'OH which are addition compounds of a monohydric lower molecular aliphatic alcohol with a member selected from the group consisting of ethylene oxide, propylene oxide and mixtures thereof, said mixtures of compounds Z'OH having an average molecular weight of 400–5000, $a'$ is a number having values between 1 and 15, and $b'$ is a number having values of 2 and 10.

10. An equilibrated mixture of compounds of the general formula:

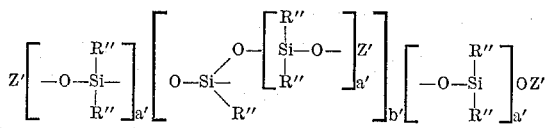

wherein R'' represents $CH_3$, Z' represents a radical derivated from a compound and mixtures of compounds which are addition compounds of a monohydric lower molecular aliphatic alcohol with a member selected from the group consisting of ethylene oxide, propylene oxide and mixtures thereof, said mixtures of compounds Z'OH having an average molecular weight of 400–5000, $a'$ is a number having values of 3 to 8, $b'$ is a number having values of 2 to 6.

References Cited in the file of this patent
UNITED STATES PATENTS

| | | |
|---|---|---|
| 2,834,748 | Bailey et al. | May 13, 1958 |
| 2,909,549 | Bailey | Oct. 20, 1959 |